United States Patent [19]
Pekarske

[11] Patent Number: 5,233,600
[45] Date of Patent: Aug. 3, 1993

[54] METHOD AND APPARATUS FOR IDENTIFYING A FAILED SPAN IN A NETWORK OF SPAN INTERCONNECTED NODES

[75] Inventor: Robert J. Pekarske, Plano, Tex.

[73] Assignee: Alcatel Network Systems, Inc., Richardson, Tex.

[21] Appl. No.: 562,785

[22] Filed: Aug. 6, 1990

[51] Int. Cl.⁵ .................................. H04L 12/26
[52] U.S. Cl. ................................ 370/14; 370/16; 371/20.1
[58] Field of Search ............ 370/13, 13.1, 14, 15, 370/16, 17, 110.1; 371/8.2, 11.2, 20.1, 20.2

[56] References Cited

U.S. PATENT DOCUMENTS 5,070,497 12/1991 Kleine-Altekamp ............... 370/13

Primary Examiner—Douglas W. Olms
Assistant Examiner—Melvin Marcelo
Attorney, Agent, or Firm—Bruce C. Lutz; Dennis O. Kraft

[57] ABSTRACT

A method is illustrated for identifying which one of a plurality of signal transmitting spans in a communication network of signal spans, such as bundles or sets of DS3 signals, has been interrupted by some type of failure. This identification is based on a local level knowledge, as opposed to prior art network level knowledge, by monitoring each circuit in a given span for either a directly observable signal impairment, or an alarm indication signal (AIS) and sending an IDLE whenever a directly observable signal impairment or an alarm indication signal is detected and declaring that the channel immediately upstream from that node has failed when either the directly observable signal impairment or the alarm indication signal is received for longer than a predetermined period of time. Such a determination as to the whereabouts of a failed span can then be used for other processes such as implementation of a network restoration scheme.

6 Claims, 2 Drawing Sheets

METHOD AND APPARATUS FOR IDENTIFYING A FAILED SPAN IN A NETWORK OF SPAN INTERCONNECTED NODES

THE INVENTION

The present invention is generally concerned with electronics and, more specifically, is concerned with telecommunication-type electronics. Even more specifically, the invention is concerned with a network having a plurality of intelligent nodes where at least some of the nodes have a plurality of available circuit paths and there is no overall network level knowledge to determine where a failure may have occurred between nodes in the system.

BACKGROUND

Whenever a communication system covering large distances is designed with pluralities of nodes with interconnecting signal traffic spans between source and destination, it has been important to know which span or which node is the source of a problem when communications fail. If the point of failure cannot be somewhat localized, the only recourse is to check the entire communication link from source to destination for the problem. This function of localizing the area of a failure for repair becomes even more important when the sophisticated communications networks of today allow a communication hookup to follow any of many different paths in accordance with circuit capacity available at the time of communication initiation. In other words, in making a call from Los Angeles to New York, a connection could be made such that the call might detour through either Seattle or Atlanta if a more direct connection through Kansas City, Mo. is fully loaded and cannot accommodate any more communication circuits.

Typically, in the prior art, the determination as to where a breakdown in communications has occurred is performed by a central intelligence which may periodically check the functioning of each span in an overall network using some type of communications to detect and localize the failure point, and report the problem along with an approximation of the point of failure so that repair crews can be dispatched to fix the communication link failure and/or communication can be rerouted around the failed portion.

When central controllers are utilized, there is already a knowledge of the sequence of nodes through which a circuit travels. Present day technology also provides for an alarm indication signal (AIS) as a replacement for the data communication signal. This AIS is generated by various intelligent nodes in the network, such as a cross-connect switch, detecting a directly observable signal impairment (DOSI). Such a DOSI might be complete lack of signal, loss of frame bits or some other easily recognized phenomenon. Each node receiving an AIS signal will pass it on to the next node. Since a central controller knows the sequence of nodes through which a circuit travels preceding the first node in a series which transmit AIS and which do not, the central controller can locate the fault as preceding the first node in series which outputs AIS.

Due to the complexity of using a central controller for large areas and the problems involved in network restoration on a substantially real-time basis, attempts are being made to provide distributed intelligence at each cross-connect in a communication network. The present invention utilizes a concept of using each intelligent node, such as a cross-connect, to monitor each circuit received for a directly observable signal impairment or a first format signal, such as the previously referenced alarm indication signal. If a node detects a directly observable signal impairment or a first format signal, it sends a second format signal downstream and times the length of reception of the DOSI or the first format signal. The second format signal could be something such as a fairly recently established IDLE signal as set forth by the American National Standard for Telecommunications. A given node declares failure of a channel in the span immediately upstream from that node when either the directly observable signal impairment or the first format signal is detected for longer than a predetermined period of time. It should be noted that an AIS signal can be generated in today's networks by devices other than intelligent nodes. One example of such a signal generating device is a fiber optic terminal. Fiber optic terminals are used to convert fiber optic signals to electrical signals for use in cross-connects, gateways or other devices in the network. These semi-intelligent boxes may generate the AIS signal due to loss of reception of the laser signal or due to some circuit failure within the fiber optic terminal itself. It will be realized that a cross-connect cannot instantaneously detect and change the lack of a signal or the first format signal to a different format signal. Thus, the lack of signal or the first format signal may pass through the entire circuit path and then in a ripple effect, the signal is changed to a different format signal by each intelligent node downstream from the device initially detecting a failure. Since each intelligent node in the network is known to provide such an alteration in the signal format, the existence of a DOSI or the AIS signal for longer than the time necessary for this change to ripple through the network provides a localization indication of the failure being in the span immediately upstream from the node detecting the problem for longer than a given predetermined period of time.

It is thus an object of the present invention to have a means of ascertaining at a local level or intelligent node level, the internode signal span having a failure mode.

Other objects and advantages will be apparent from the reading of the specifications and dependent claims in conjunction with the drawings wherein:

DETAILED DESCRIPTION

Figure 1:
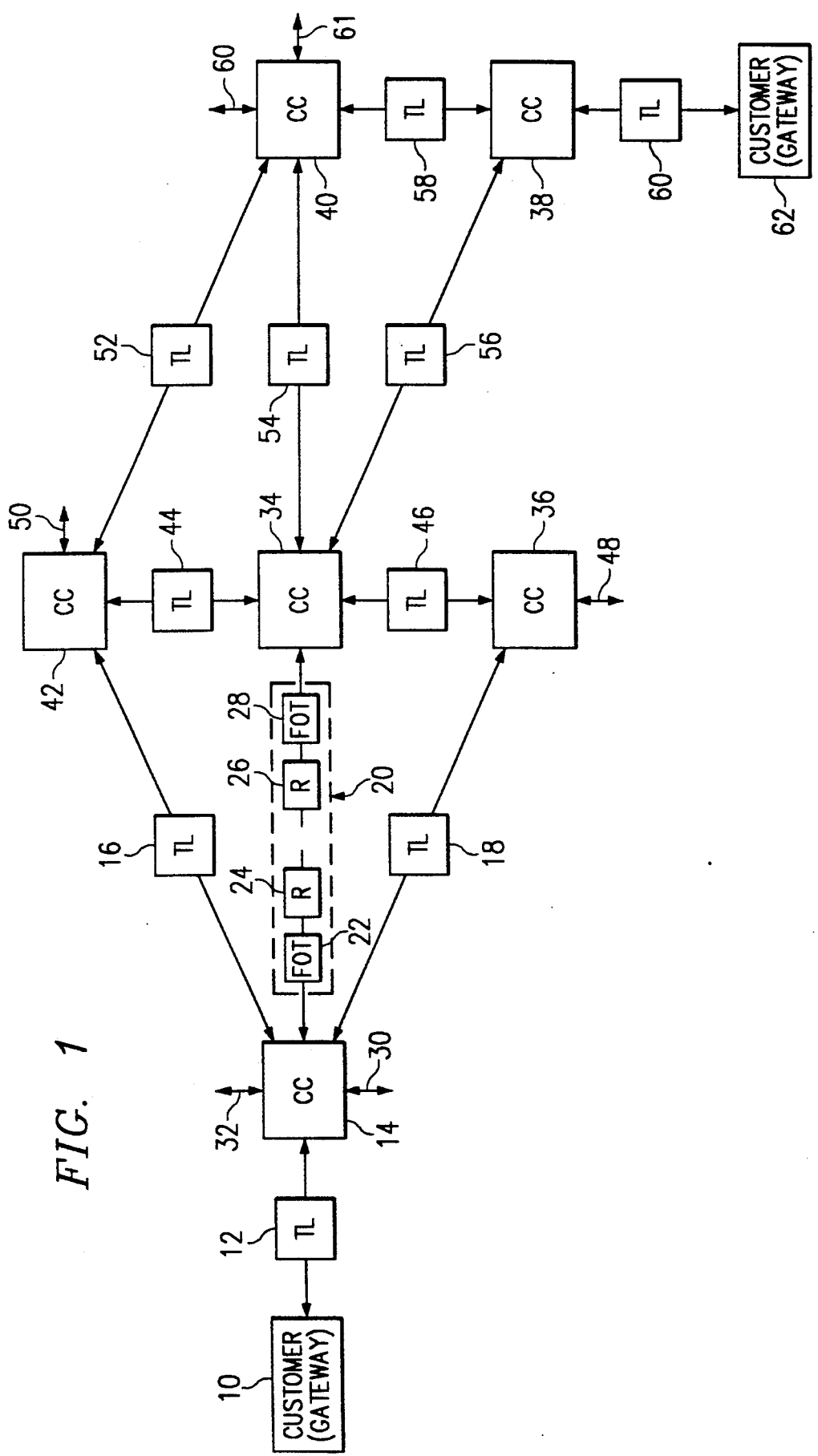
FIG. 1 is a block diagram of a network including intelligent nodes such as cross-connects and semi-intelligent alarm indicating devices such as fiber optic terminals situated in transmission links interconnecting the nodes.

In FIG. 1, a customer or gateway block 10 is connected through a transmission link 12 to a first cross-connect 14. Cross-connect 14 is connected to other devices in the network by various transmission links, such as 16 and 18 as well as a dash line transmission link 20. Within transmission link 20 is shown a fiber optic terminal (FOT) block 22, a repeater 24, a repeater 26 and a further fiber optic terminal 28. Within transmission link 20 there may be further repeaters. The fiber optic terminal 22 for the purposes of this invention will be assumed to be an intelligent network entity which can detect some types of directly observable signal impairment and generate an alarm indication signal as a result of such detection. Upon such detection, the AIS signal is transmitted to any node downstream. The cross-connect 14 may also be connected to other nodes by transmission links shown incompletely as 30 and 32. The transmission link 20 is connected to a cross-connect 34. Also shown in FIG. 1 are cross-connects 36, 38, 40 and 42. A transmission link 44 connects cross-connects 34 and 42. A transmission link 46 connects cross-connect 34 with 36. A further transmission link 48 is shown connected to cross-connect 36 to a node not illustrated. A transmission link 50 is connected from cross-connect 42 to a node not illustrated. A transmission link 52 is connected from cross-connect 42 to cross-connect 40. A transmission link 54 is connected from cross-connect 34 to cross-connect 40. A transmission link 56 is connected from cross-connect 34 to cross-connect 38. A transmission link 58 is connected from cross-connect 40 to cross-connect 38. Further transmission links 60 and 61 are connected to cross-connect 40 and connected to nodes not illustrated. A transmission link 60 is connected from cross-connect 38 to a customer or gateway block designated as 62. As shown, the most direct route from customer block 10 to customer block 62 would be from cross-connect 14 to 34 to 38 using transmission links 20 and 56. However, as illustrated, transmission link 20 is broken due to some type of failure such as a backhoe digging through the line. With the network as shown, however, the customer 10 can be connected by various network restoration means through other transmission links such as 18 and 46 via cross-connect 36, or transmission links 16, 52 and 58 via cross-connects 42 and 40. Other paths will also be apparent to the casual observer of FIG. 1.

The cross-connects 34 may be any intelligent node, such as a cross-connect, which has the capability of detecting an alarm indication signal, or other first format signal and retransmitting as an output a second format signal, such as an idle signal. One example of a cross-connect which can perform this function, is a 51 Mb Sonet Standard Rate version of a RDX-33 cross-connect made by Rockwell International and sold through its Network Transmission Systems Division in Dallas, Tex. This cross-connect has incorporated therein one or more central processing units which can be programmed to provide various monitoring and maintenance functions.

Figure 2:
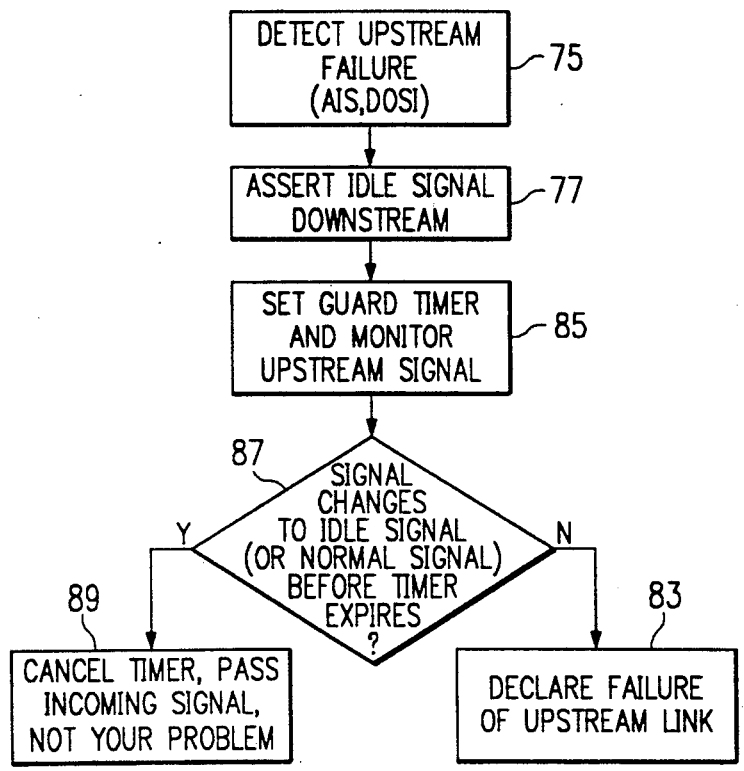
FIG. 2 is a flow diagram showing the approach used within each intelligent node for declaring whether or not a failure has occurred immediately upstream from that node.

The failure signal detection function of the present invention is set forth in FIG. 2 where the intelligence within the node first detects an upstream failure either through the detection of an alarm indication signal, or other directly observable signal impairment, such as loss of signal, in block 75. The program will then cause the unit to issue a second format signal, such as an IDLE signal, to downstream units as said forth in step or block 77. The output from block 77 goes to a block 85, which sets a timer and continues to monitor the upstream signal. The process goes to a decision block 87, which checks to see if the incoming failure signal has changed to an IDLE or normal signal before the timer expires. If, in fact, it does change before the timer expires, the process proceeds to block 89 and cancels the timer and merely passes the incoming signal to the output with a determination that the problem is not in the transmission link immediately upstream from that intelligent node. On the other hand, if the incoming AIS signal continues beyond the end of the timer, the process proceeds to block 83 where it declares failure of the transmission link immediately upstream from that node.

Figure 3:
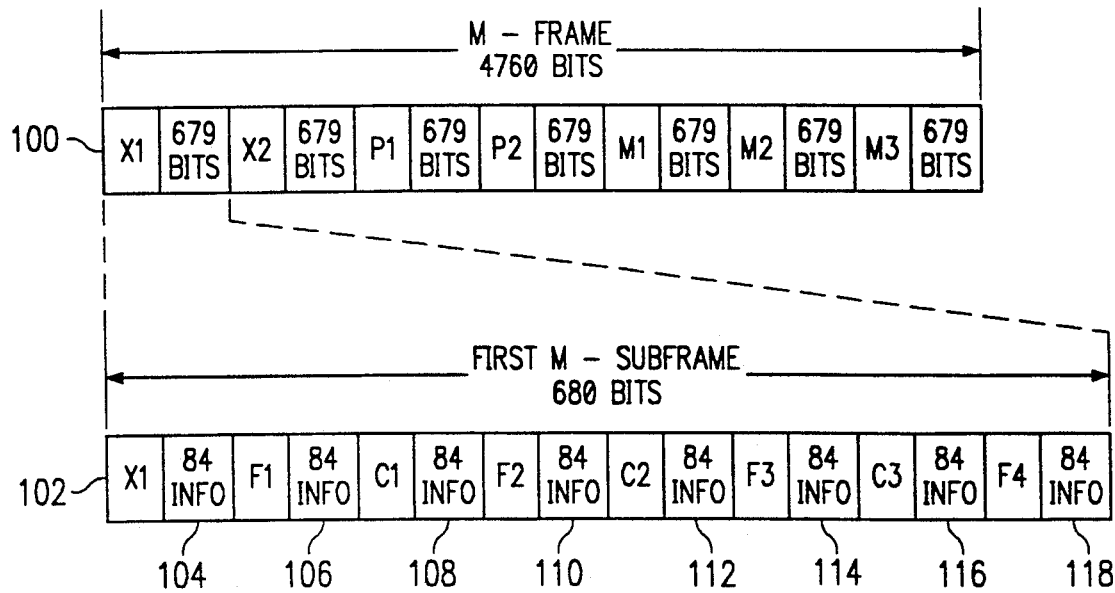
FIG. 3 is a bit map indication of a signal frame used in a DS3 type communication channel which is used in explaining the mode of operation of the present inventive concept.

Block 100, in FIG. 3, shows a 4,760 bit frame of a DS3 signal as defined in the American National Standard for Telecommunications entitled, "ANSI T1.107a-1989". The main frame is comprised of 7 subframes where each subframe has various overhead bits, such as X, F, C, P and M bits intermixed with data or other information bits. The first subframe is presented in more detail in block 102. It will be noted that each subframe contains eight 84-bit groups of data bits labeled from 104 to 118. According to the aforementioned standard, a first format or alarm indication signal is present when the information bits are set to a 1010 sequence starting with a 1 after each M frame alignment bit, M subframe alignment bit, X bit, P bit and C bit channel. The alarm indication signal also sets the C1, C2 and C3 bits to 0, while the X bits are each set to 1.

According to the standard, an IDLE signal, which may comprise the previously mentioned second format signal, is defined as a situation where the information bits are set to a 1100 sequence, starting with a 11 after each M frame alignment, M subframe alignment, X bit, P bit, and C bit channels. Further, the C bits will be set to 0 in the M subframe 3 and the remaining C bits in M subframes 1, 2, 4, 5, 6 and 7 may be individually a 1 or a 0 and may vary with time. The X bits are set to a 1. It may be thus ascertained that the prime difference between the AIS signal and the idle signal is that the information bits in the AIS signal are a 1010 signal for the AIS signal and a 1100 sequence for the idle signal. Since the X bits in both formats are the same, and while the C bits could be different, they could also have the same logic values.

OPERATION

The present inventive concept can be utilized with any distributed intelligence communication network wherein first and second format signals can be transmitted that are unique and reasonably easy to detect and transparent to the transport. Since one embodiment of the invention is to be used in connection with a telephone system using cross-connects as the distributed intelligent nodes, the operation will be discussed in connection with such cross-connect devices. Further, since the cross-connect devices, such as the RDX33 previously referenced and sold by Rockwell include the capability of detecting and transmitting an alarm indication signal (AIS) as a first format signal, and further include the capability of detecting and transmitting an IDLE signal as a second format signal, these two signals will be utilized in discussing the operation for this embodiment of the inventive concept.

When a transport failure occurs, such as the break shown in transmission link 20 of FIG. 1, it manifests itself to the cross-connect 34 and any remaining cross-connects in the communication channels involved, such as 14 and 38 in one of two forms. If the first intelligent network entity downstream from the failure is a cross-connect, such as would be the case if the failure occurred between FOT 28 and cross-connect 34, then the failure will manifest itself to the cross-connect 34 as a loss of signal or other directly observable signal impairment. This may be described as a DOSI case. This loss of signal will permeate the entire communication link before any intelligent node is likely to detect the existence of the DOSI and generate an appropriate signal. If the first intelligent network entity downstream from the failure is not a cross-connect, such as the FOT 28 or FOT 22 illustrated within transmission link 20, then that network entity will report the failure and generate an AIS signal to all downstream nodes. For communications from block 10 to 62, this AIS signal would be generated by FOT 28. For signals from block 62 to block 10, such an AIS signal would be generated by block 22.

In the DOSI instance where a break were to occur between FOT 28 and cross-connect 34, the cross-connect 34 internally records that a failure has occurred and generates an idle signal to all downstream nodes, such as cross-connect 38. A timer is set to see if the signal returns to a normal signal or it turns to an IDLE signal before a timed period. It is possible that a downstream node would detect a loss of signal on a channel and issue an idle signal before an upstream node (which actually has a direct connection to the failed transmission link) can complete such a function. At the expiration of the timed period with no changes in the DOSI, the point of failure is assumed to be the link immediately upstream.

A similar set of events occurs in the AIS case where a cross-connect first receives an AIS signal. Before detection of the AIS signal, it will pass the AIS signal to the destination and this may involve a plurality of further cross-connects. Upon detection of the AIS signal format, the node will generate an IDLE signal and transmit this IDLE signal downstream. Upon detection of this AIS signal, a timer is set to see if the received AIS signal changes to a valid signal, such as an IDLE or even a normal signal, before the timer expires. If a valid signal appears prior to expiration of the timer, the node terminates the attempted fault isolation and declares that no fault has been found. This can be done because receipt of an IDLE signal indicates that the signal traversed at least one participating cross-connect prior to reaching the given node. Thus the signal is not immediately upstream. Receipt of any other valid signal indicates correction of the problem which generated the initial AIS signal. This could be accomplished by any of many network restoration solutions which are not a part of the present inventive concept. In either event, no further work is required of the specific cross-connect node finding the received signal return to a valid signal prior to expiration of the timer. On the other hand, the expiration of the timer prior to receiving an IDLE signal causes the node to declare a failure on the channel immediately upstream.

In one embodiment of the inventive concept the timer was set to exceed the maximum of (1) the duration of any equipment protection switching (this was found to be approximately 60 milliseconds) and (2) the time required to convert the signal to IDLE and for the converted signal to propagate 2,000 miles at DS3 rates and be detected by the next cross-connect.

While any signal can be used as the second format signal other than an IDLE signal, the criteria are that the second format signal must cause no adverse reaction by an intervening transport and must be detectable by the intelligent node.

It should be noted that if a break occurs in transmission link 20 as illustrated, both cross-connects 14 and 34 would receive AIS signals from the appropriate fiber optic terminal intelligent network entities 22 and 28. If, however, the break were to occur between FOT 28 and cross-connect 34, the cross-connect 34 would merely observe impairment of the signal, such as lack of signal, while the FOT 28 would transmit an AIS signal which would be received by cross-connect 14. Thus cross-connects 14 and 34 would both declare the transmission link 20 to have failed, although one would proceed from a directly observable signal impairment lasting longer than the timer while the other would detect the AIS signal lasting longer than the timer.

In summary, I have set forth a method whereby a node in a network of identically constructed nodes in a multipath network can determine whether a fault in the total communication path has occurred in the link immediately upstream from that node. This can be accomplished even though some of the links may incorporate intelligent network entities which respond to certain faults by transmitting a first format or alarm indication signal and other transmission links may not contain any such intelligent network entities. As a consequence of this capability the nodes will also operate correctly when a break occurs between the last intelligent network entity in the link and the node so that a first format signal is only sent to one of the two nodes connected to the link. Because the detection of an anomaly in the system is slow as compared with the time of transmission of a given signal from source to sink in the system (input to output of the network in question) and during which time the signal passes through a multiplicity of nodes, there is typically a ripple effect so that all nodes in a data path will first see a lack of signal when a break occurs somewhere in the data connection. The detection of the lack of signal may cause an intelligent network entity other than a node to generate a first format or alarm indication signal. The present day intelligent network entities do not have the capability of producing a second format signal such as an IDLE signal. Only the cross-connects in present day DS3 systems have the capability of producing an IDLE signal which would correspond to the second format signal for the purposes of this application. As each node detects the reception of the first format signal, it generates a second format signal for transmission downstream. A timer is set to measure the time of reception of either a directly observable signal impairment such as loss of synchronization or lack of signal, and if either the directly observable signal impairment or the AIS first format signal is received for longer than the conversion and propagation time between nodes, a node can correctly assume that the transmission link immediately upstream from that node has a failure situation.

While I have described the present invention with regard to DS3 signals and cross-connects as nodes, I wish to be limited not to the specific embodiment shown as a preferred first embodiment but only by the scope of the appended claims wherein I claim:

I claim:

1. A method for identifying which span, in a distributed intelligence network having an arbitrary number of intelligent cross-connect switch nodes and an arbitrary number of spans interconnecting said nodes is the site of a break in communications, each said span having working circuits between nodes designated for transmitting actual communications traffic and some of said spans having spare circuits between nodes capable of, but not designated for, transmitting actual communications traffic, at least some of said spans including circuitry for detecting a DOSI (directly observable signal impairment) and for outputting an AIS (alarm indication signal) signal to nodes downstream in response to such detection of DOSI, said method comprising the steps of each node:
  a) periodically monitoring each circuit received in a given span for either a DOSI or an AIS signal;
  b) sending an IDLE signal downstream whenever a DOSI or an AIS signal is detected and timing the period of detection of said DOSI or said AIS signal; and
  c) declaring failure of the channel in the span immediately upstream from said node when either a DOSI or an AIS signal is detected for longer than a predetermined period of time.

2. A method for identifying which circuit bundle, in a distributed intelligence network having an arbitrary number of intelligent nodes and an arbitrary number of circuit bundles interconnecting said nodes, is the site of a break in communications, each said circuit bundle having working circuit channels between nodes designated for transmitting actual communications traffic and some of said circuit bundles having spare circuit channels between nodes capable of, but not designated for, transmitting actual communications traffic, at least some of said circuit bundles including circuitry for detecting DOSI (directly observable signal impairment) and for outputting a signal having a first format to nodes downstream in response to such detection of DOSI, said method comprising the steps of each node:
  a) monitoring each circuit channel received in a given circuit bundle for DOSI or a signal having a first format;
  b) sending a second format signal downstream whenever a DOSI or a received signal of the first format is detected and timing the period of detection of said DOSI or said signal having the first format; and
  c) declaring failure of the channel in the circuit bundle immediately upstream from said node and which contains the circuit in question when either a DOSI or a signal having said first format is detected for longer than a predetermined period of time.

3. A signaling system comprising, in combination:
  a plurality of cross connect switch nodes;
  communication signal carrying circuit bundles interconnecting said nodes at least some of which circuit bundles include both spare and working circuit channels;
  first means, contained within at least some of said circuit bundles, for detecting DOSI (directly observable signal impairment of received signal) and for outputting a given format first signal to nodes downstream in response to such detection of DOSI;
  second means, comprising a part of each one of said switch nodes, for monitoring each circuit channel received in a given circuit bundle for DOSI or a signal having said given format;
  third means, comprising a part of each one of said switch nodes, for sending a signal having a further format downstream whenever a DOSI or a signal of the given format is detected and for timing the period of reception of said DOSI or said signal having the given format; and
  fourth means, comprising a part of each one of said switch nodes, for declaring failure of the channel in the circuit bundle immediately upstream from said node and which contains the circuit in question when either a DOSI indication, or a signal having said given format is received by said node for longer than a predetermined period of time.

4. A signal switching node for use in a communication system including a plurality of switching nodes for handling and redistributing received traffic obtained via communication signal carrying circuit bundles interconnecting said nodes where at least some of said circuit bundles include intelligent devices to detect upstream DOSI (directly observable signal impairment of received signal) to output a given format first signal downstream in response to such detection comprising, in combination:
  first means for monitoring each circuit channel received on a given circuit bundle for DOSI or a signal having a given format;
  second means for sending a signal having a second format downstream whenever a DOSI is detected and for timing the period of detection of the DOSI;
  third means for sending the second format signal downstream whenever a signal of the given format is detected and for timing the period of reception of said signal having said given format; and
  fourth means for broadcasting a third format signal to other signal switching nodes in the communication system declaring failure of a circuit channel in the circuit bundle immediately upstream from said node when either a DOSI or a signal having said given format is received by said node for longer than a predetermined period of time.

5. A method for identifying that a failure has occured immediately upstream from a given intelligent node, in a distributed intelligence network having an arbitrary number of similarly operating intelligent nodes and an arbitrary number of circuit bundles interconnecting said nodes, each said circuit bundle having working circuit channels between nodes designated for transmitting actual communications traffic and some of said circuit bundles having spare circuit channels between nodes capable of, but not designated for, transmitting actual communications traffic, at least some of said circuit bundles including circuitry for detecting DOSI (directly observable signal impairment) and for outputting a signal having a first format to nodes downstream in response to such detection of DOSI, said method comprising the steps of:
  a) monitoring each circuit channel received in a given circuit bundle of a network of multi-circuit channel circuit bundle interconnected intelligent nodes for DOSI or an signal having a first format;
  b) sending a signal having a second format downstream whenever a DOSI or a received signal of the first format is detected and timing the period of detection of said DOSI or said signal having the first format; and
  d) declaring failure of the channel in the circuit bundle immediately upstream from said node and which contains the circuit in question when either a DOSI or a signal having the first format is received for longer than a predetermined period of time.

6. A signal switching node for use in a communication system including a plurality of identical switching nodes comprising, in combination:

first means for receiving a plurality of upstream signal circuit channels as part of a given circuit bundle in a communication system;

second means for outputting a like plurality of circuit channels as part of at least one downstream circuit bundle in the communication system;

third means for monitoring each circuit channel received for a DOSI (directly observable signal impairment) or an AIS signal having a first format;

fourth means for sending an IDLE second format signal downstream whenever a DOSI or an AIS signal of the first format is detected;

fifth means for timing the period of detection of DOSI or of said AIS signal having the first format; and sixth means for declaring failure of a circuit channel in the circuit bundle immediately upstream from said node when either a) a DOSI is detected for longer than a predetermined period of time, or b) an AIS signal having the first format is received by said node for longer than a predetermined period of time.

* * * * *